United States Patent [19]

Phillips

[11] Patent Number: 4,934,882
[45] Date of Patent: Jun. 19, 1990

[54] APPARATUS FOR MONITORING THE ANGULAR POSITION OF A WORKPIECE

[75] Inventor: James D. Phillips, Posen, Mich.

[73] Assignee: J. D. Phillips Corporation, Alpena, Mich.

[21] Appl. No.: 426,416

[22] Filed: Oct. 25, 1989

[51] Int. Cl.$^5$ ............................................. B23Q 3/00
[52] U.S. Cl. .................................. 409/165; 51/165.74;
51/237 CS; 51/281 C; 279/111; 409/205;
409/220
[58] Field of Search ............... 409/199, 165, 166, 168,
409/205, 220, 221; 279/111; 51/165.74, 165.75,
217 T, 237 CS, 281 C

[56] References Cited
FOREIGN PATENT DOCUMENTS 53-4285  1/1978  Japan ............................ 51/237 CS
57-21261 2/1982  Japan ............................ 51/237 CS Primary Examiner—Daniel Howell
Attorney, Agent, or Firm—Barnes, Kisselle, Raisch, Choate, Whittemore & Hulbert

[57] ABSTRACT

Apparatus for monitoring or tracking the angular position of a rotating camshaft during grinding or milling of cams on the camshaft. The cams may be milled, but in the apparatus shown, they are ground by abrasive belts which are guided by actuators driven by CNC controlled motors, to obtain the desired cam contours. Monitoring is carried out by a pick-up member engageable with a locating pin on the camshaft. The pick-up member has a slot for receiving the locating pin between a locator pad and a leaf spring. The leaf spring clamps the pin against the locator pad. The pick-up member will closely follow the rotation of the camshaft despite variations in pin size, and feed back the exact rotative position of the camshaft to the CNC controlled motors consistently and accurately.

7 Claims, 1 Drawing Sheet

U.S. Patent    Jun. 19, 1990    4,934,882
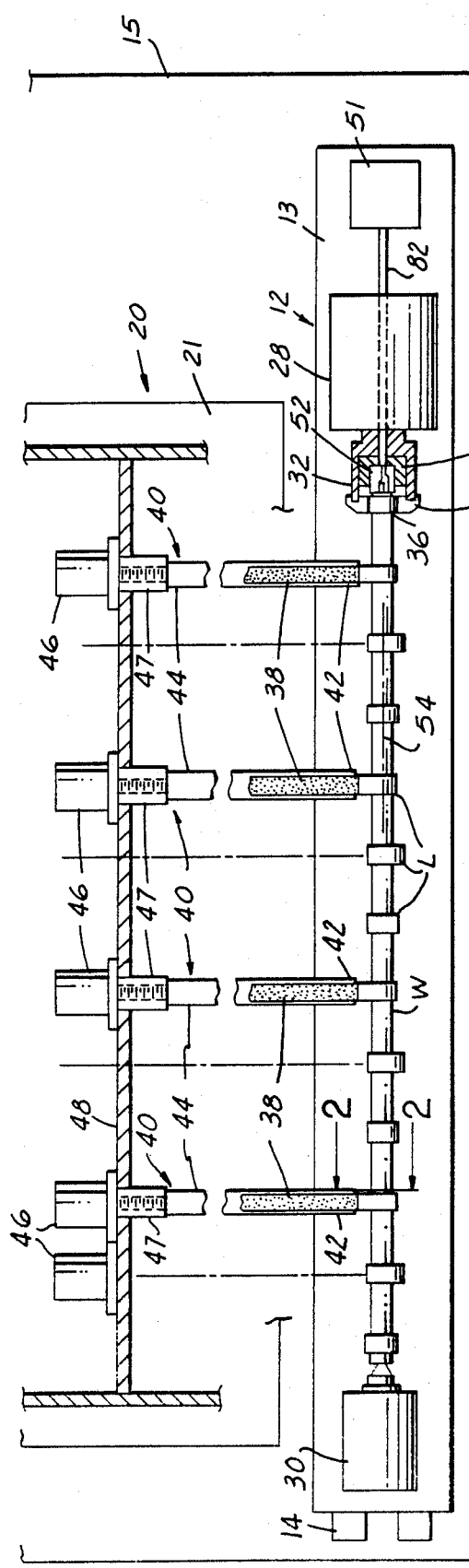
FIG. 1
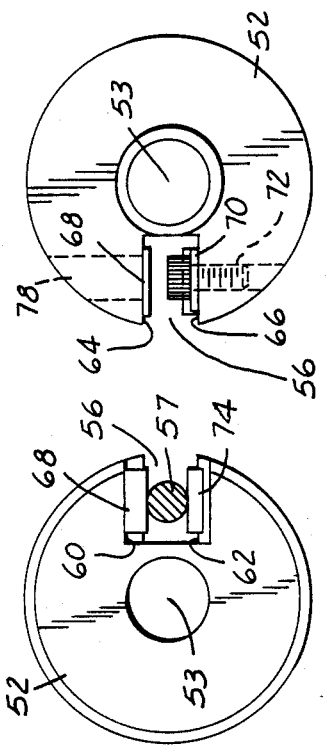
FIG. 4
FIG. 5
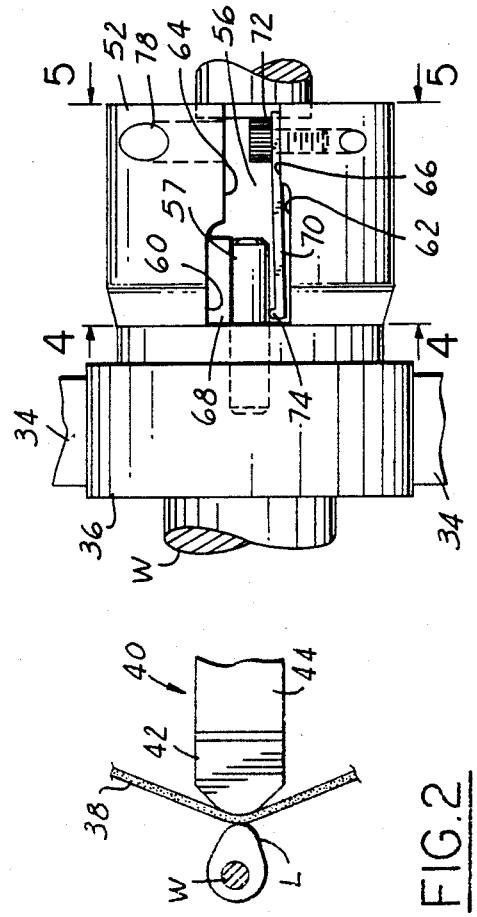
FIG. 3
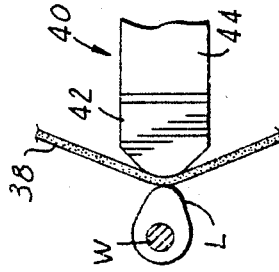
FIG. 2

APPARATUS FOR MONITORING THE ANGULAR POSITION OF A WORKPIECE

This invention relates to apparatus for monitoring the angular position of a rotating workpiece, as in a grinding or milling operation, for example.

BACKGROUND AND SUMMARY OF THE INVENTION

Cam lobes on a camshaft can be roughed or finished to the desired contour by grinding or milling. As shown in my co-pending U.S. patent application Ser. No. 07/377,067, filed July 10, 1989, the roughing or finishing of such cams may be carried out by abrasive belts. The belts are guided along variable paths according to the cam contours desired. Specifically, each belt is guided by a shoe which engages the backside of the belt at its point of contact with the cam periphery. Each shoe is mounted on one end of an actuator which is moved by a power unit. The power unit is CNC controlled to move the actuator back and forth, and hence cause the shoe to move the abrasive belt toward and away from the camshaft axis. In order to accurately grind the cam lobes, it is desirable to continuously track or monitor the angular position of the camshaft during its rotation so that this information can be input to the CNC controlled power unit for its proper operation.

In the past, the monitoring of the angular position of the workpiece has been carried out by mechanism including a pick-up member adapted to engage a locating pin on the workpiece. Locating pins vary in diameter from camshaft to camshaft, and accordingly the pick-up member usually has an enlarged hole or recess for receiving the pin. This has the advantage of making it possible for the pick-up member to accommodate pins of varying diameter. However, the disadvantage is that the pick-up member can only imprecisely follow the rotation of the workpiece, resulting in inaccurate feed back to the CNC control.

One object of this invention is to provide an improved pick-up member adapted to closely follow the rotation of the workpiece despite variations in pin size, and accordingly feed back to the CNC control the exact rotative position of the workpiece at all times, consistently and accurately.

In accordance with a specific embodiment about to be described, the pick-up member has a locating pad and yieldable, resilient means in spaced, opposed relation to the locating pad for clamping the pin on the workpiece against the locating pad.

More particularly, the resilient, yieldable means comprises a leaf spring one end of which is secured to the pick-up member and the free end of which opposes the locating pad.

These and other objects and features of the invention will become more apparent as the following description proceeds, especially when considered with the accompanying drawings.

BRIEF DESCRIPTION OF THE DRAWINGS

FIG. 1 is a semi-diagrammatic top plan view with parts broken away, of apparatus incorporating the invention.

FIG. 2 is a fragmentary view taken on the line 2—2 in FIG. 1.

FIG. 3 is a fragmentary side elevational view showing one end of a workpiece, such as a camshaft, and a pick-up member provided with means for receiving a locating pin on the workpiece, the pick-up member being adapted to transmit information relative to the angular position of the workpiece to a CNC control through an electronic angular feed-back device.

FIG. 4 is a view of the pick-up member taken on the line 4—4 in FIG. 3.

FIG. 5 is a view of the pick-up member taken on the line 5—5 in FIG. 3.

DETAILED DESCRIPTION

Referring now more particularly to the drawings, there is shown a machine for roughing or finishing the cam lobes on a camshaft. Although this function may be carried out either by a grinding machine or a milling machine, the machine shown in the drawings is a grinding machine. The grinding machine is designated by the numeral 10 and has a workholding unit 12 comprising a table 13 slidably mounted on ways 14 on a supporting base 15 and movable to an adjusted position along the ways by reversible drive mechanism, not shown. The machine also has a grinding unit 20 comprising a slide 21 mounted on the base 15 for movement at right angles to the ways 14 by reversible power mechanism, not shown. For a more complete description of the machine, reference is made to my co-pending application Ser. No. 07/377,063 referred to above.

In general, the workholding unit 12 has a headstock 28 and a tailstock 30 to support the workpiece W which in this instance is an elongated camshaft having a plurality of eccentric cams or cam lobes L formed in spaced apart relation along the length thereof. The headstock 28 has a chuck 32 provided with jaws 34 adapted to grip the enlarged cylindrical end portion 36 of the camshaft W and a motor for rotating the chuck. The tailstock 30 has a center which rotatably supports the opposite end of the camshaft.

The grinding unit 20 has a plurality of abrasive belts 38 equal in number to the cams on the camshaft. The belts are respectively aligned with the cams and driven by a suitable source of power, not shown. The abrasive belts are adapted to grind the peripheries of the cams as they move past the camshaft. The abrasive belts are guided at their points of contact with the cam peripheries along variable paths according to the cam contours desired. Guiding is accomplished by means of a guiding mechanism 40 for each cam.

Each guiding mechanism 40 comprises a shoe 42 which engages the belt on the side opposite its grinding surface and an elongated actuator 44. The shoe of each guiding mechanism is mounted on one end of the actuator and has a rounded, blunt, convex nose which engages the belt. A motor 46 moves the actuator 44 lengthwise in opposite directions by means of a ball screw drive 47. The motors 46 are mounted on a frame 48 and each motor is controlled independently of the others, by a CNC controller, not shown. Thus as the camshaft rotates, the guiding mechanisms 40 move the abrasive belts independently to grind special contours on the cams, under the control of the CNC controllers.

The angular position of the camshaft is important to the operation of each guiding mechanism. Information relative to the angular position of each cam is fed to the CNC controller for that cam by electronic angular feed-back mechanism including an electronic angular feed-back device 51 and a pick-up member 52.

The pick-up member 52 is adapted to be keyed to the camshaft in a manner which will be described, to monitor its angular position. The pick-up member 52 is mounted in headstock 28 for rotation about its central axis 53 which coincides with the central axis of rotation 54 of the camshaft when the camshaft is gripped in the chuck 32. Specifically, the pick-up member 52 is freely rotatable in a bearing 55 within the chuck. Thus the pick-up member 52 turns independently of the chuck so that it will accurately track the angular position of the camshaft even though the grip of the chuck on the camshaft should slip.

The pick-up member 52 has a slot 56 in one side wall which extends from one end of the pick-up member to the other and is parallel to its axis of rotation 53 but laterally off-set therefrom. The enlarged end portion 36 of the camshaft has a locating pin 57 which is parallel to its axis of rotation but laterally off-set the same distance as slot 56 so that the locating pin 57 is adapted to extend into the slot.

The slot 56 has spaced apart, opposed surfaces 60 and 62 which are parallel to the central axis 53 of the pick-up member and also parallel to each other. Surface 60 has a raised surface portion 64 and surface 62 has a raised surface portion 66, which surface portions are spaced apart, opposed and parallel to one another. These raised surface portions 64 and 66 are located at the end of the pick-up member 52 remote from the camshaft.

A locating pad 68 is rigidly secured to surface 60 of the slot 56 at the end of the pick-up member 52 nearest to the camshaft. An elongated leaf spring 70 is disposed in slot 56 and extends parallel to the central axis of the pick-up member. One end of the leaf spring 70 is secured to the raised surface portion 66 by a bolt 72. The other end portion of the leaf spring terminates at the end of the pick-up member adjacent to the camshaft in spaced opposed relation to the locating pad 68, and has an enlarged tip 74 extending toward the locating pad. The tip 74 is rounded so that the locating pin 57 cams the leaf spring 70 away from pad 68 when inserted endwise into the slot. The leaf spring provides a yieldable, resilient means operable to clamp the locating pin 57 against the locating pad 68 with a yielding, resilient pressure. The locating pad 68 and leaf spring 70 provide locators for consistently, accurately following the rotation of the camshaft despite variations in pin size.

A hole 78 is formed in the side wall of the pick-up member 52 which is larger in diameter than the head of the bolt 72, enabling the bolt to be installed and removed through the hole.

The pick-up member 52 is connected to the electronic angular feed-back device 51 by a shaft 82. The angular position of the camshaft W is transmitted by the pick-up member 52 to the feed-back device 51 which relays such information to the CNC controllers for the actuator motors 46.

In use, the pick-up member 52 is rotated to a position such that it will receive the locating pin 57 on the camshaft when the camshaft is placed between the headstock 28 and tailstock 30 and gripped by the jaws of the chuck 32. The locating pin 57 inserts endwise into the slot between locating pad 68 and leaf spring 70, camming the leaf spring away from pad 68 when it engages the tip 74. The leaf spring will flex as much as necessary to receive the locating pin 57 and will clamp the locating pin firmly against pad 68 with a yielding, resilient pressure. The space between the clamping tip 74 of the leaf spring 70 and the locating pad 68 in the natural, unflexed condition of the leaf spring provides a minimum clearance which is less than the diameter of any of the locating pins on camshafts likely to be encountered. The leaf spring will always flex to some extent and clamp the locating pin 57 against the locating pad, no matter what the diameter of the locating pin may be. Thus the locating pad 68 and leaf spring 70 will grip the locating pin and provide an accurate indication of the angular position of the camshaft despite variations in pin size. The pick-up member 52 will accurately monitor or track the angular position of the camshaft and transmit such information to the feed-back device 51 which in turn relays it to the CNC controllers.

As stated above, the pick-up member 52 is mounted in bearing 55 so as to be free to turn independently of the chuck. Therefore, the pick-up member, which is keyed to the camshaft, will accurately monitor the angular position of the camshaft and will not transmit an erroneous signal even if the grip of the chuck on the camshaft should slip.

What is claimed is:

1. In apparatus for rotating a workpiece such as a camshaft wherein means are provided for monitoring the angular position of the workpiece during its rotation comprising a rotatable pick-up member engageable with a locating pin provided on the workpiece in offset relation to its axis of rotation, the improvement wherein said pick-up member has means for receiving the locating pin on the workpiece despite variations in pin size so as to consistently, accurately follow the rotation of the workpiece, said pin receiving means comprising a locating pad on said pick-up member, and yieldable, resilient means on said pick-up member in spaced, opposed relation to said locating pad, said locating pad and said yieldable, resilient means being adapted to receive the locating pin on the workpiece therebetween and said yieldable, resilient means being operable to clamp the locating pin against said locating pad with a yielding, resilient pressure.

2. The apparatus defined in claim 1, wherein said pick-up member has a slot formed therein having spaced apart, opposed surfaces, said locating pad being mounted on one of said opposed surfaces and said yieldable, resilient means being mounted on the other of said opposed surfaces.

3. The apparatus as defined in claim 1, wherein said yieldable, resilient means comprises a leaf spring one end portion of which is secured to said pick-up member and the other end portion of which is free to flex and opposes said locating pad.

4. The apparatus defined in claim 1, wherein said pick-up member is mounted for rotation on the axis of rotation of the workpiece, said pick-up member has a side wall, and a slot in said side wall having spaced apart, opposed surfaces, said locating pad being mounted on one of said opposed surfaces and said yieldable, resilient means being mounted on the other of said opposed surfaces.

5. The apparatus as defined in claim 4, wherein said yieldable, resilient means comprises a leaf spring one end portion of which is secured to said pick-up member and the other end portion of which is free to flex and opposes said locating pad.

6. In apparatus for rotating a workpiece such as a camshaft wherein means are provided for monitoring the angular position of the workpiece during its rotation comprising a rotatable pick-up member engageable with a locating pin provided on the workpiece in offset relation to its axis of rotation, the improvement wherein said pick-up member has means for receiving the locating pin on the workpiece despite variations in pin diameter so as to consistently, accurately follow the rotation of the workpiece, said pin receiving means comprising a first locator on said pick-up member, and a second locator on said pick-up member in spaced, opposed relation to said first locator, said locators being adapted to receive the locating pin on the workpiece therebetween and said second locator being yieldably, resiliently mounted and operable to clamp the locating pin against said first locator with a yielding, resilient pressure.

7. The apparatus defined in claim 1, wherein drive means are provided for rotating the workpiece and including a chuck adapted to grip the workpiece, and bearing means mounting said pick-up member in said chuck for free rotation independently of said chuck, whereby said pick-up member will accurately monitor the angular position of the workpiece even if the grip of the chuck on the workpiece should slip.

* * * * *